T. BEDNAROWICZ.
TROLLEY HARP.
APPLICATION FILED NOV. 21, 1910.
1,017,034.
Patented Feb. 13, 1912.
2 SHEETS—SHEET 1.
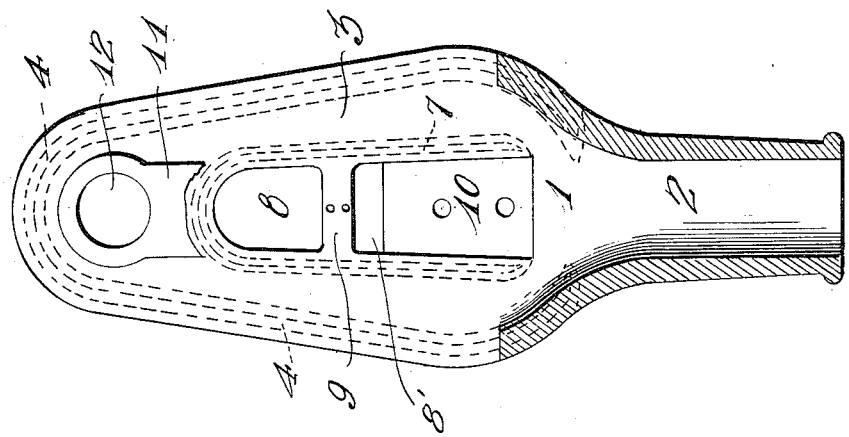
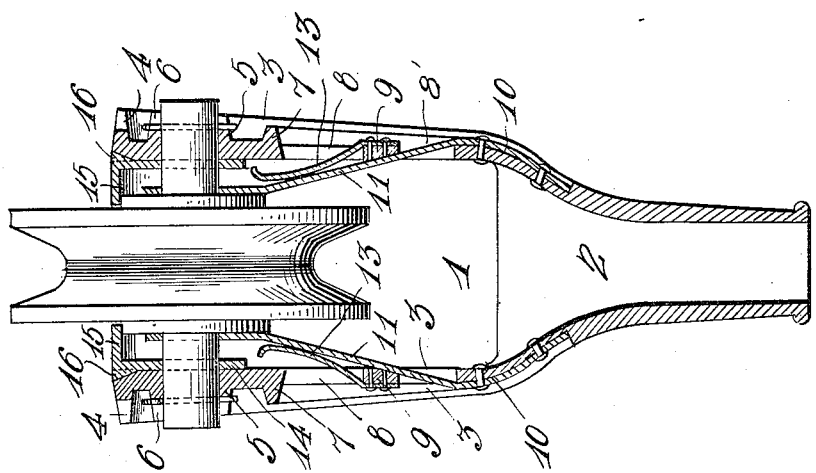
Witnesses
C. R. Hardy
O. B. Hopkins
Inventor
Theopihl Bednarowicz
by H. B. Willson & Co.
Attorneys

T. BEDNAROWICZ.
TROLLEY HARP.
APPLICATION FILED NOV. 21, 1910.

1,017,034.

Patented Feb. 13, 1912.

2 SHEETS—SHEET 2.

Witnesses
C. R. Hardy
O. Hopkins

Inventor
Theopihl Bednarowicz
by H. B. Willson & Co.
Attorneys

COLUMBIA PLANOGRAPH CO., WASHINGTON, D. C.

UNITED STATES PATENT OFFICE.

THEOPIHL BEDNAROWICZ, OF SOUTH BEND, INDIANA.

TROLLEY-HARP.

1,017,034. Specification of Letters Patent. Patented Feb. 13, 1912.

Application filed November 21, 1910. Serial No. 593,587.

*To all whom it may concern:*

Be it known that I, THEOPIHL BEDNAROWICZ, a citizen of the United States, residing at South Bend, in the county of St. Joseph and State of Indiana, have invented certain new and useful Improvements in Trolley-Harps; and I declare the following to be a full, clear, and exact description of the invention, such as will enable others skilled in the art to which it appertains to make and use the same.

This invention relates to improvements in trolley harps.

One object of the invention is to provide a trolley harp having an improved construction and arrangement of contact springs whereby a perfect electric connection may be had between the trolley harp and wheel.

Another object is to provide means whereby, should the wire become disengaged from the wheel the wire will be prevented from catching the wheel and the forks of the harp.

With these and other objects in views, the invention consists of certain novel features of construction, combination and arrangement of parts as will be more fully described and particularly pointed out in the appended claims.

Figure 2:
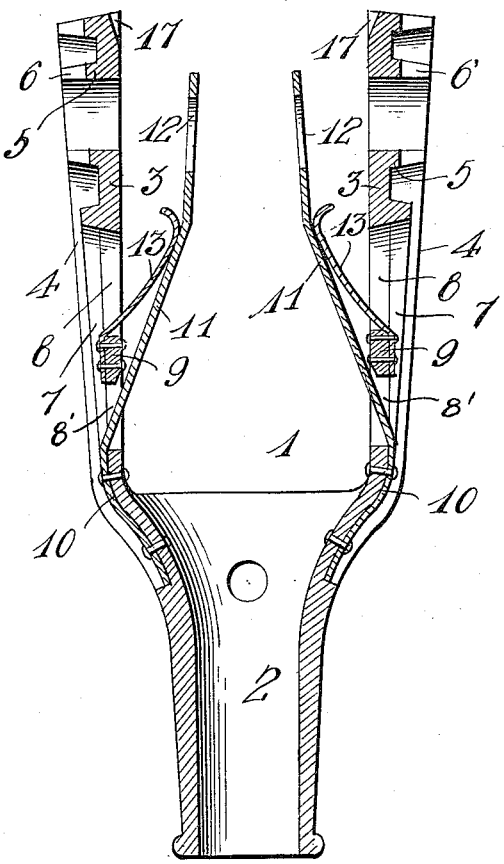
Figure 4:
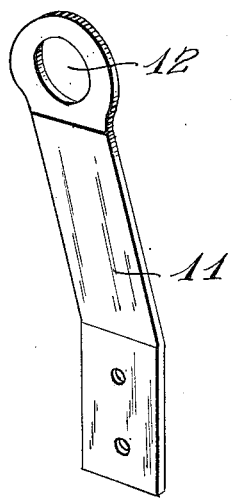
Figure 5:
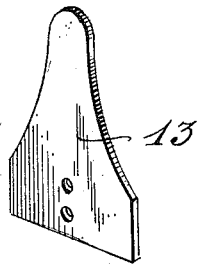
Figure 6:
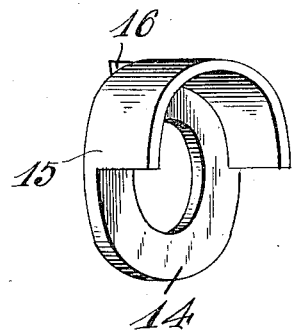

In the accompanying drawings: Figure 1 is a vertical sectional view of my improved trolley harp taken on a line with the center of the wheel shaft and showing a wheel arranged in position therein; Fig. 2 is a similar view with the wheel removed; Fig. 3 is a central vertical section taken at right angles to Fig. 2; Fig. 4 is a detail perspective view of one of the contact springs; Fig. 5 is a similar view of one of the reinforcing springs; Fig. 6 is a similar view of one of the washers employed between the hubs of the wheel and the sides of the fork.

Referring more particularly to the drawings, 1 denotes my improved harp which comprises a socket 2 adapted to be engaged with the upper end of the trolley pole. On the socket 2 is formed the forks 3 of the harp said forks comprising flat plates having arranged near their outer edge circumferential flanges or ribs 4 whereby the forks are rigidly braced. In the upper portions of the forks 3 on the outer sides thereof are formed hubs 5 with which the journals or ends of the trolley wheel shaft are engaged. The hubs 5 and the upper portion of the flanges 4 are provided with alined notches 6 through which cotter pins may be passed and engaged with the ends of the trolley wheel axle whereby the latter is held in position in the harp. On the outer sides of the forks 3 are formed inner ribs 7 whereby the forks are further strengthened. Between the upper portion of the ribs 4 is formed an opening 8 across which is arranged an integrally formed bridge 9.

In the center of the forks between the lower ends of the ribs 7 is formed a recess 10 in which is secured the lower outer ends of contact springs 11, the upper portions of which are bent at an angle and project through openings 8' below the apertures 8 and are disposed adjacent to the inner sides of the upper portion of the forks as shown. In the upper ends of the springs 11 are formed passages 12 through which the ends of the trolley wheel shaft are adapted to pass. The lower ends of the springs 11 are riveted to the outer sides of the forks 3 in the recessed portion 10 thereof. The upper portion of the springs are adapted to frictionally engage the opposite sides of the trolley wheel hub around the ends of the shaft, said ends projecting through the passages 12 of the springs as hereinbefore described. The springs 11 are preferably formed of bronze or similar material and in order to impart a greater amount of resiliency or elasticity to the same, I provide small steel reinforcing springs 13 which are secured at their lower ends to the bridges 9 and have their upper ends bearing against the outer sides of the contact springs 11 whereby the latter are more firmly held in engagement with the hubs of the trolley wheel and a better electric contact thus obtained.

In order to prevent the trolley wire from catching in between the hubs of the trolley wheel and the adjacent side of the forks, I preferably provide washers 14 which are engaged with the trolley wheel and shaft adjacent to the inner sides of the forks as shown. Projecting from the upper portion of the washers are formed inwardly projecting semi-circular flanges 15, said flanges being of sufficient width as to project a considerable distance over the opposite ends of the hub of the trolley wheel, thus preventing any possibility of the trolley wire from catching in between the wheel and adjacent forks of the harp and further provide a cover for the contacting springs. In order to hold the washers against rotation on the shaft of the trolley wheel and thereby maintain the flanged upper portion thereof above the hub of the trolley wheel, I provide said washers on their outer sides adjacent to their upper edges with wedge shaped locking lugs 16 which are adapted to engage similarly shaped recesses 17 formed in the adjacent inner surfaces of the sides or forks of the harp as shown.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a trolley wheel harp a pole engaging socket, a pair of wheel supporting fork members formed on said socket, outwardly projecting hubs formed on the upper ends of said fork members, a trolley wheel shaft engaged with said hubs, a trolley wheel revolubly mounted on said shaft, washers arranged on the shaft between the trolley wheel and the side bars or the fork member, guard flanges formed on the upper sides of said washers and adapted to project over the hubs of the trolley wheel whereby the trolley wire is prevented from entering between the wheel and the adjacent sides of the fork members of the harp and locking lugs formed on the outer sides of said washers and adapted to engage the upper edges of the fork members whereby the washers are held in operative position with the guard flanges thereon above the hub of the wheel.

2. In a trolley harp a pole engaging socket, wheel supporting fork members formed on said socket, said fork members having therein bearing hubs, a wheel supporting shaft arranged in said hubs, a trolley wheel revolubly mounted on said shaft, contact springs secured at their lower ends to the sides of the fork members of the harp and having formed in their outer ends apertures adapted to receive the ends of the trolley wheel shaft, reinforcing springs secured to the sides or fork members of the harp and adapted to engage said contact springs whereby the latter are held in positive electrical engagement with the hubs on the trolley wheel, washers arranged on the shaft between the ends of the trolley wheel hub and the inner sides of the fork members of the harp, said washers having a semi-circular inwardly projecting guard flange formed on the enlarged upper portion of each of said washers, said guard flanges projecting over the hub of the trolley wheel thereby positively preventing the trolley wire from catching between the wheel and the sides or fork members of the harp, and means formed on said washers whereby the same are held in position to maintain the guard flanges thereon above the hub of the trolley wheel.

In testimony whereof I have hereunto set my hand in presence of two subscribing witnesses.

THEOPIHL BEDNAROWICZ.

Witnesses:
JAMES GRANT,
JOHN HENRY DARR.

Copies of this patent may be obtained for five cents each, by addressing the "Commissioner of Patents, Washington, D. C."